Aug. 23, 1955  R. HINGST  2,715,893
REGENERATOR FIRING PLANT
Filed Sept. 10, 1952
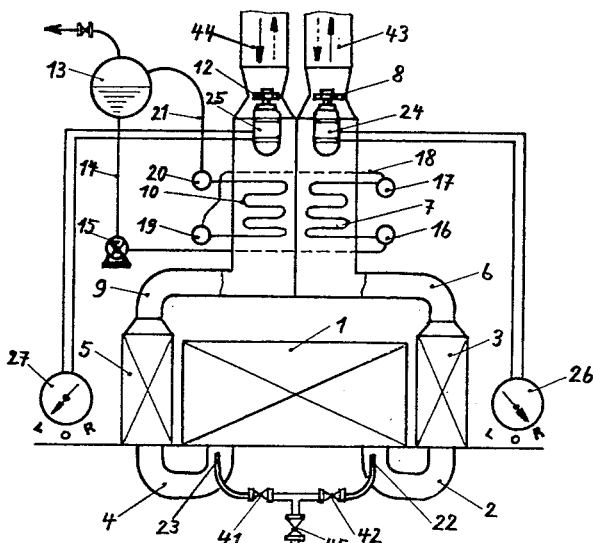
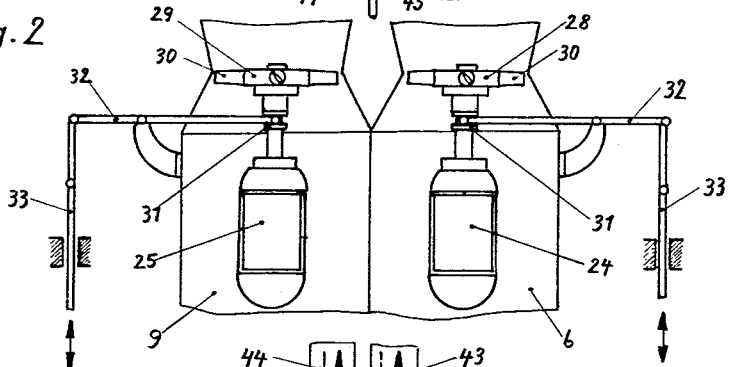
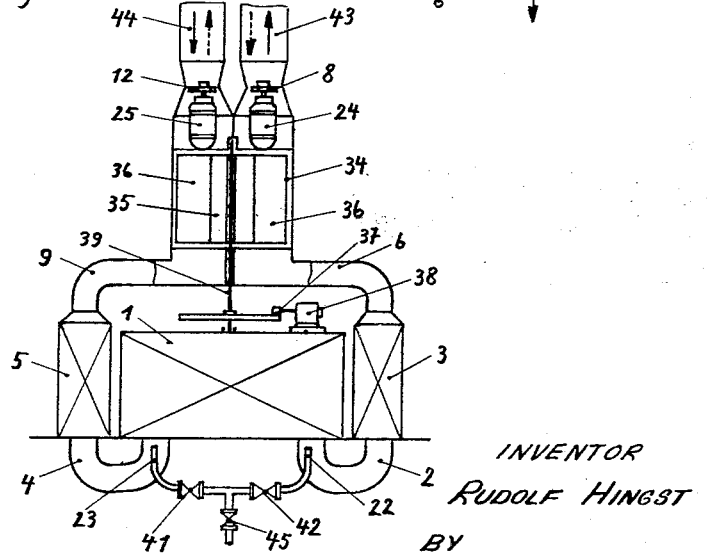
INVENTOR
RUDOLF HINGST
BY
Bailey, Stephens & Huettig
ATTORNEYS

United States Patent Office 2,715,893
Patented Aug. 23, 1955

2,715,893

REGENERATOR FIRING PLANT

Rudolf Hingst, Kassel-Wilhelmshohe, Germany

Application September 10, 1952, Serial No. 308,884

Claims priority, application Germany September 20, 1951

1 Claim. (Cl. 122—1)

This invention relates to certain improvements in or relating to regenerator firing plants.

It is an object of the present invention to facilitate the periodic and alternate reversing or switching of the two cooperating regenerators, from the heat accumulation phase where the exhaust gases of the furnace are sucked through the cooled down generator, to the phase of air heating where the air for combustion is passed by a blower through the regenerator in which heat has been accumulated, and vice versa.

A special object of the invention is to effect such switching without necessitating the operation of control or butterfly valve means for the air and exhaust gas ducts, since it is difficult to ensure reliable operation and tightness of such valve means so that high costs for constructing and maintaining such valves would occur.

A still further object of the invention is to provide means for ensuring a higher utilization of the heat contained in the exhaust gases of the furnace.

With these and further objects in view, according to the present invention a blower adapted for supplying air in both directions is arranged in the air duct of each regenerator and the reversing from the heat accumulating phase to the air heating phase is effected by reversing the direction of delivery of the blowers.

Preferably propeller blowers with more or less curved vanes are used for this purpose.

The reversing of the direction of delivery can be achieved by reversing the direction of rotation of the driving motors of the blowers.

By way of alternative, controlled pitch propellers may be used whose control devices permit adjustment to both sides beyond the zero position.

Since a higher blower output is required for supplying the exhaust gases than for supplying the fresh air, it is preferred to vary also the number of revolutions or the actual pitch or angle of incidence of the propeller as the direction of delivery is reversed, so as to have a higher number of revolutions, or a greater pitch of the propeller, respectively, when delivering the exhaust gases and a smaller number of revolutions or a smaller pitch of the propeller when supplying fresh air, in proportion to the larger and smaller volume of the gases to be conveyed.

According to a further feature of the present invention the air for combustion is preheated before being entered into the regenerator. Thus the regenerator is cooled down to a lesser degree so that the furnace gases heating up the regenerator after the reversing are cooled down to a lesser degree and leave the regenerator at a higher temperature. These hotter gases in turn permit a better utilization of the waste heat and permit, for instance, also the production of high pressure steam. The preheating of the air for combustion may be effected for instance, in an air preheater of the type of the well-known Ljungström air preheater or by steam which is produced in a waste heat boiler which is heated by the exhaust gases.

According to a preferred form of the invention the preheating of the air for combustion is effected by steam in such a way that waste heat boilers are arranged in both regenerator ducts, said boilers being connected or combined in such a way that a circulation of their contents through both boilers is attained. This arrangement operates in such a way that the heating surfaces of the waste heat boilers alternately act to absorb heat from the furnace gases coming from the regenerators, for heating the contents of the boiler, and to transmit heat from the contents of the boiler to the air for combustion passed through the regenerator to the burners of the furnace. The heat transmitted to the air for combustion rises with the saturation temperature in the boiler, and simultaneously the amount of heat absorbed by the regenerators from the furnace gases is decreased.

Other and further objects, features and advantages of the invention will be pointed out hereinafter and appear in the appended claim forming part of the application.

In the accompanying drawings several now preferred embodiments of the invention are shown by way of illustration and not by way of limitation.

Fig. 1 is a diagrammatic view showing a plant including waste heat boiler means and blowers driven by reversible motors, Fig. 2 is a diagrammatic view showing blowers with controllable pitch propellers, and Fig. 3 is a diagrammatic view showing a plant with rotary air preheater.

Similar reference numerals denote similar parts in the different views.

In the drawing, 1 is a furnace, for instance, a glass melting furnace or the like, which is heated by alternatingly operating burners 22 and 23, arranged in separate burner chambers and connected with a regenerator 3 through a pipe 2 and with a regenerator 5 through a pipe 4.

Accommodated in the duct 6 coming from the regenerator 3 are a waste heat boiler 7 and a blower 8. Similarly, a waste heat boiler 10 and a blower 12 are built in the regenerator duct 9. The two waste heat boilers 7 and 10 are interconnected in such a way that their contents is circulated through both boilers. From a drum 13 for water of condensation the water passes through vertical tubes 14 to a circulating pump 15 by which the water is supplied at first to the distributor 16 of the boiler 7. The upper collector 17 of the boiler 7 is connected to the distributor 19 of the boiler 10 through a pipe 18. From the upper collector 20 of the boiler 10 leads an ascending pipe 21 to the collector 13 for water of condensation. The pipes 43 and 44 connected to the ducts 6 and 9, above the blowers 24 and 25, lead into the open air.

The blowers may be propeller type blowers with blades or vanes which are not curved, or curved only very little, adapted for delivery in both directions. The reversal of the direction of rotation may be effected by simply reversing the direction of rotation of the driving motors, for instance, electromotors 24 and 25, by change-over switches 26 and 27. The number of revolutions of the motors may be varied simultaneously to adapt the blower output to the different volumes of gas to be conveyed in case of fresh air and in case of exhaust gas, respectively. The full line arrows in the drawing indicate the case where the exhaust gases of the furnace 1 are sucked through the regenerator 3 while the blower 12 supplies the fresh air, through the regenerator 5 which has been heated up in the previous phase, to the burner pipe 4. In this case heat is transmitted by the furnace gases to the waste heat boiler 7 and from the contents of the boiler to the air for combustion passed along the coils of the waste heat boiler 10. On reversal of the direction of delivery of the two blowers 8 and 12 the blower 12 sucks the exhaust gases of the furnace through the regenerator 5, and the blower 8 supplies the air for combustion through the regenerator 3 to the burner pipe 2, as indicated by the arrows shown in dotted lines. Now heat is transmitted from the furnace gases to the boiler 10 and the air for combustion is heated by passage along the coils of the waste heat boiler 7. It will be understood that in the first case only the burner or burners 23 and in the second case only the burner or burners 22 are in operation since in per se known manner in the first case only the valve 41 is open while valve 42 is closed and vice versa. The common main valve is denoted 45.

In Fig. 2 in place of propellers with fixed blades, propellers 28, 29 with controllable pitch blades 30 are provided whose adjustment may be effected in known manner, for instance, by an adjusting sleeve 31, which can be operated by a lever 32 and a control rod 33. The reversal of the direction of delivery is effected by reversing the angle of incidence of the blades 30 accordingly by means of control rod 33 through lever 32 and sleeve 31. The actual angle of incidence or pitch of the propeller may be varied simultaneously to adapt the blower output to the different volumes of gas to be conveyed in case of fresh air and in case of exhaust gas, respectively. Of course, it will be appreciated that the electromotors driving the blowers in this case must be of the type having a substantially constant number of revolutions under different load conditions.

In Fig. 3 a rotatable multi-cell air preheater 34 of the Ljungström system is provided instead of the waste heat boilers 7 and 10 for accumulating and transmitting to the air for combustion the heat of the exhaust gases. The preheater 34 consists of a rotary drum 35 partitioned in cells or chambers 36 and being rotatable about a shaft 39 by a motor 38 through a gear 37.

The operation of this plant is similar to that of the plants described with reference to Figs. 1 and 2 except that the preheating of the air for combustion in this case is effected by passing the air for combustion through chambers 36 of the preheater which have been heated up by the exhaust gases in the exhaust gas duct 6 and are being turned into the channel 9 by continuous rotation through motor 38 and gear 37. The air for combustion is preheated in these heated chambers 36. The chambers 36 which had been cooled down in the duct 9 by the air for combustion passing through duct 9 are simultaneously turned into the exhaust gas duct 6 where they are reheated by the exhaust gases. In other words, owing to the continuous rotation of the chambers 36, heat is continuously exchanged between the channels 6 and 9 or between the gases passing through said channels, respectively.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claim.

I claim:

A regenerator firing plant comprising two separate burner chambers adapted to be operated alternatively, separate regenerators connected to each burner chamber, respectively, separate ducts for each regenerator for either supplying combustion air or exhausting gases, a reversible blower in each duct, one of the blowers acting as an exhaust blower for withdrawing the combustion products while the other blower simultaneously acts as a means for conducting air for combustion to the burner, heating coils in each duct between the blower and the regenerator, and means interconnecting said heating coils for circulating fluid from one heating coil through the other heating coil, whereby the fluid heated by exhaust gases in one heating coil is circulated to heat the other heating coil and the combustion air passing thereby.

References Cited in the file of this patent

UNITED STATES PATENTS

| | | |
|---|---|---|
| 1,326,033 | DeErb, Jr. | Dec. 23, 1919 |
| 1,464,002 | Isley | Aug. 7, 1923 |
| 1,721,735 | Isley | July 23, 1929 |
| 1,762,299 | Isley | June 10, 1930 |
| 1,762,300 | Isley | June 10, 1930 |

FOREIGN PATENTS

| | | |
|---|---|---|
| 403,798 | France | Oct. 4, 1909 |